Dec. 25, 1962          P. BASKIN          3,069,787

ELECTRON DISCHARGE DEVICE PROCESSING APPARATUS

Filed Jan. 2, 1959          3 Sheets-Sheet 1

INVENTOR
Paul Baskin
BY
Robert E. Strausser
ATTORNEY

Dec. 25, 1962 P. BASKIN 3,069,787
ELECTRON DISCHARGE DEVICE PROCESSING APPARATUS
Filed Jan. 2, 1959 3 Sheets-Sheet 2

Fig. 2

INVENTOR
*Paul Baskin*
BY
*Robert E. Strausser*
ATTORNEY

Dec. 25, 1962 P. BASKIN 3,069,787
ELECTRON DISCHARGE DEVICE PROCESSING APPARATUS
Filed Jan. 2, 1959 3 Sheets-Sheet 3
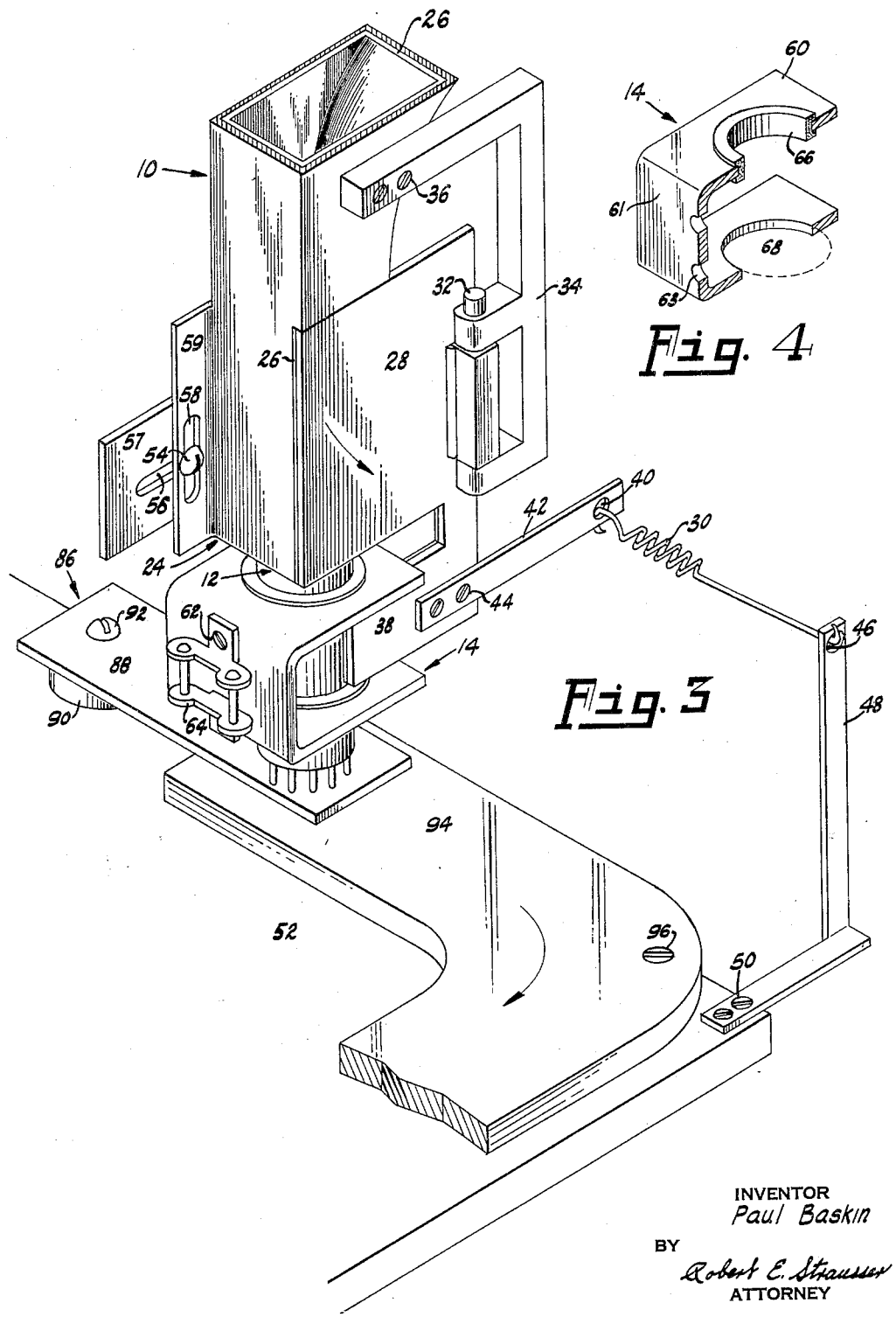
INVENTOR
Paul Baskin
BY
Robert E. Strausser
ATTORNEY

United States Patent Office 3,069,787
Patented Dec. 25, 1962

3,069,787
ELECTRON DISCHARGE DEVICE
PROCESSING APPARATUS
Paul Baskin, Shawnee, Okla., assignor, by mesne assignments, to Sylvania Electric Products Inc., Wilmington, Del., a corporation of Delaware
Filed Jan. 2, 1959, Ser. No. 784,608
1 Claim. (Cl. 34—236)

This invention relates to a method and apparatus for processing electron discharge devices and more particularly to the processing of those devices which have been non-uniformly heated in previous manufacturing operations.

Electron discharge devices normally consist of an electrode structure of some sort which has been sealed in an evacuated hermetic envelope. In many devices such as radio receiving tubes the envelope is made of soft glass which is heated, evacuated and sealed on automatic equipment. The envelope, in addition to the electrode structure, usually encloses getter material which is utilized to clean up any gasses remaining in envelopes after evacuation. This getter may be fired or flashed by induction heating or other means during the time the device is on the sealing machine or if the electrode structure is particularly temperature sensitive it may be advantageous to flash after the tube has been cooled. This last named method of flashing is generally called "post-flashing" to indicate that it is done after the tube has been completely processed otherwise.

The envelope is evacuated through a tubulation which is attached either to the bulb portion of the envelope or, in larger tubes, to the base portion. The final operation performed on the sealing machine is tipping off wherein the tubulation is heated near its junction with the envelope to a temperature considerably above its softening point and pinched or tipped off. Although the envelope and its contents are heated during the evacuating process, they are not heated to the higher temperature required for the tipping off operation. The resulting temperature differential was the cause of many rejected devices due to the formation of cracks and leaks caused by the strains set up in the glass by uncontrolled cooling of the tube after removal from the sealing machine. A prior method used in the industry was the placing of the device in a horizontal position on a turntable type conveyor after removal from the sealing machine. This was supposed to equalize the exposure of the non-uniformly heated device to the ambient by causing the device to rotate about its longitudinal axis as it progressed from the center of the turntable to the periphery. This was not a satisfactory solution to the problem since it resulted in cracks due to unequal cooling of tubes which failed to rotate, produced additional strains in the envelope due to differential cooling since one portion of the glass envelope was always in contact with the conveyor while the other was exposed to the ambient, caused additional work to be done due to the tube pins being bent in the jam-ups which frequently occurred. In addition, the jams which occurred made it impossible to run quality and performance checks on the individual exhaust ports of the sealing machine when post-flashing was utilized since clearing the jams resulted in the tubes being taken off the turntable out of sequence. The gas condition of the device depends on the exhausting operation, therefore, the devices should be kept in the sequence in which they come off the sealing machine until after flashing so that a faulty exhaust port may be located.

The above mentioned problems have plagued the industry for many years. Therefore, it is an object of this invention to control the processing of post-flashed non-uniformly heated glass enveloped electron discharge devices.

It is another object of this invention to reduce the number of rejects produced by previous handling methods.

It is still another object of this invention to enable an operator to determine whether the exhausting operation is being performed properly on each of a plurality of exhaust ports of an evacuating and sealing machine.

The foregoing objects are achieved in one aspect of the invention by transferring the non-uniformly heated tube from a sealing machine to one of a plurality of carriers with the major axis of the tube disposed in the vertical direction. The tube and its associated carrier are then passed through a controlled environment wherein the temperature differentials of the glass envelope are allowed to disperse gradually. The tube and carrier are then force cooled to or near the ambient temperature. The getter is then flashed to complete the internal processing of the tube.

For a better understanding of the invention, reference is made to the following description taken in conjunction with the accompanying drawings in which:

FIG. 2 is an elevation view in partial section of the apparatus of FIG. 1.

FIGURE 3 is a perspective view of the loading chute, and a portion of the pin slide track; and FIGURE 4 is a sectional perspective view of one of the carriers showing the heat insulating insert.

Figure 1:
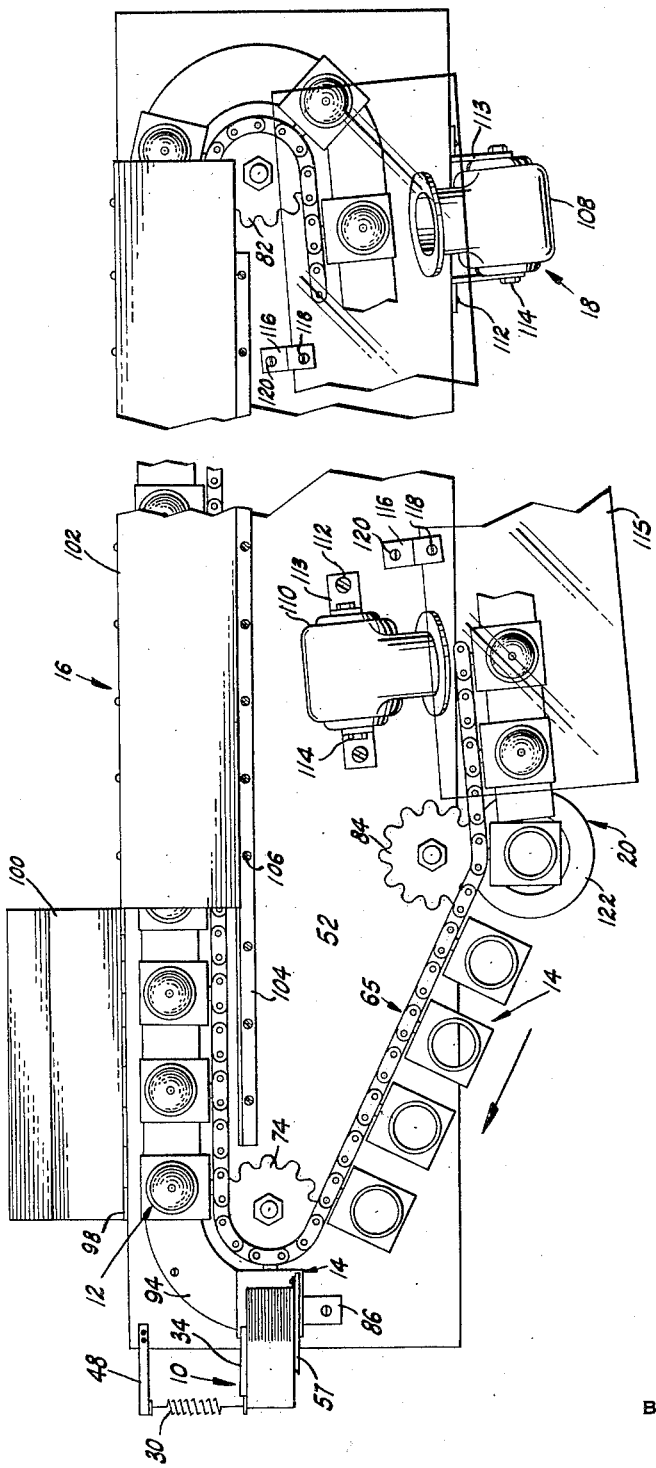
FIG. 1 is a plan view of the apparatus showing the loading chute, plurality of carriers employed, controlled environment, forced tube cooling means, and the getter flashing means.

Referring to the drawings, there is shown a loading chute 10 through which the tube 12 is loaded into one of the carriers 14 with the major axis of the tube vertical. The carrier moves from the loading chute through the controlled environment or tunnel 16 in which the non-uniformly heated tube is allowed to cool gradually, and thence to the forced cooling means 18. Continued movement brings the tube to the getter flashing means 20 which cooperates with means not shown on the carrier mechanism, to flash the tube.

Referring to FIGS. 2 and 3 in greater detail, the loading chute 10 is provided to orient the tube 12 vertically for loading into a carrier 14 when it is delivered to the chute by means on the sealing machine, not shown, in a horizontal position with its base portion foremost. This orientation is accomplished by having the cross-sectional area of the chute diminish from its vertical loading end 22 adjacent the sealing machine, to its horizontal unloading end 24 adjacent the carrier 14. At the unloading end 24, the cross-section of the chute closely approximates the diameter of the tube 12 being processed, which results in accurate control of the position of the tube. The interior of the chute is lined with a heat insulating material 26 which has a low coefficient of friction to prevent rapid cooling of the tube and to cushion any contact between the tube 12 and the chute 10 during the passage of the tube through the chute.

The chute 10 is provided (FIG. 3) with a gate 28 in one side the wall. The gate is kept in a closed position by a spring 30 which is in tension between an opening 40 in the lever arm 42 which is connected by screws 44 to the gate 28 and an opening 46 in bracket 48 fastened by screw 50 to the platform 52. When a tube 12 which has been loaded into a carrier is moved, as indicated, by the carrier, the gate is pivoted on a hinge pin 32 carried by a bracket 34 mounted on the chute by screws 36 by contact of its lower portion 38 with the tube 12. If the tube 12 has not been tipped off properly in the sealing machine and a portion of the tubulation still adheres to the envelope, it will not be broken off by the chute since the gate 28 is of sufficient height to allow passage of a tubulated envelope when swung open. A heat insulating layer 26 is also present on the side of the gate 28 which comprises the interior portion of the chute 10. The vertical separation between the unloading end 24 of the chute 10 and the carrier 14 and horizontal registration in one plane with the carrier is adjusted by the cooperation of screw 54, slot 56 in the chute, support bracket 57, and slot 58 in an extension 59 of the side wall of the chute 10. Horizontal registration in the second plane is achieved by adjusting the support bracket 57 which is attached to the sealing machine, not shown, by conventional means.

A typical carrier 14, as shown in FIGS. 3 and 4, has a substantially U-shaped configuration formed to provide spaced legs 60 interconnected by a base portion 61. It is fastened by screws 62 which pass through openings 63 in the base portion 61 of the U-shape, to a link 64 of the driven chain member 65. Heat insulating inserts 66, which have a low coefficient of friction, are affixed in aligned openings 68 provided in the legs 60 of the U. The inner diameter of the insert 66 is slightly larger than the diameter of the tube 12 so as to closely retain the tube when it has been inserted.

The chain member 65 to which the carrier 14 is attached is driven by a sprocket 74. This drive sprocket is driven by an indexing mechanism 76 connected through a sprocket 78 and sprocket chain 80 to a take off sprocket on the main shaft, not shown, on the sealing machine, not shown. Through the agency of this endless chain 80 and the indexing means 76, the movement of the carriers 14 is synchronized with the delivery of tubes from the sealing machine. The chain member 65 is guided by idler sprockets 82, 84 and moves the carriers through the various positions as will be later explained.

Positioned beneath the unloading chute on the platform 52 is a spring board arrangement 86 comprising a strip 88 of spring material such as Phosphor Bronze spaced by a washer 90 above the surface of platform 52 to which it is fastened by screw 92. The spring board cushions the landing shock on the base portion of a tube 12 when it is dropped through the loading chute 10 into a carrier 14.

Indexing movement of the member 65 moves the carrier and tube from beneath the loading chute 10. The base portion of the tube is slid off the spring board 86 onto a pin track or slide 94 which is fastened by screws 96 to the platform 52. This one piece pin track conforms to the path of movement of the tubes while in a carrier and prevents damage to the pins due to contact with any surface irregularities in the platform 52.

The tube and carrier then pass into the tunnel or controlled environment 16. The tunnel has an inverted U-shaped form which is hinged to the platform 52 at one side as by the piano hinge 98 shown in FIG. 1. For ease in maintenance, the length of the tunnel may be divided into two segments 100, 102. A flange member 104 is fastened to the platform 52 by screws 106 to retain the free leg of the U-shaped tunnel when the tunnel is closed.

The forced cooling means 18 comprises a pair of opposed centrifugal blower fans 108, 110 whose output is directed toward the carriers and tubes. The fans are affixed to the platform 52 by screws 112 which pass through brackets 113 and the output of the fans may be directed by adjustment of screws 114. Positioned above the carriers at the forced cooling position is an air flow containing sheet 115 which may be transparent. This sheet directs the output of the fans 108, 110 so that most effective use thereof is made in cooling the tubes. The sheet is supported by brackets 116 which attach to the sheet by screws 118 and to the platform 52 by screws 120.

Continued movement of the carrier brings the tube to the getter flashing means 20 which is positioned beneath the platform 52 by means not shown. As the tube 12 comes to the end of the track 94 it drops from the carrier 14 into a funnel-like insertion guiding means 122 connected to one end of a R-F permeable delivery chute 123 which guides the tube to a gate 124 upon which it stops. When the tube is at rest at the gate 124 it is contained within an R-F induction coil 126 connected to a source of R-F current indicated generally at 128. At the start of the next indexing operation the R-F coil is energized by means, not shown, operated by the carrier indexing mechanism 76 causing the getter contained within the tube to be flashed. Subsequent to the flashing operation but prior to the delivery of the next tube to the funnel member 122, the gate 124 is operated by solenoid 130 allowing the tube 12 to continue through the delivery chute 123. The solenoid is also controlled by means, not shown, on the carrier indexing mechanism 76. The delivery chute 123 guides the tube to a waiting receptacle, not shown.

The operation of the apparatus shown in the drawings is most clearly illustrated by following a particular tube from the time of its tipping off on an exhaust port of the sealing machine until it has been processed. The tube 12 which has been heated during the previous processing to a temperature of approximately 800° F. and evacuated, is tipped off at one of the final stations of the sealing machine, not shown, prior to its delivery to the chute. During the tipping off operation the junction of the tubulation and envelope has been heated to approximately 1400° F. thus creating a deleterious temperature differential which may result in sufficient strain in the glass to cause cracks or leaks to be formed in the sealed envelope unless cared for properly. The tube is delivered to the chute 10 by a transfer mechanism, not shown, with its base portion foremost. It is placed in the flared vertical end 22 of the loading chute 10 and slides down to the horizontal unloading end 24 dropping through into the carrier 14 and coming to rest on the spring board 86. The chain member 65 is then caused to advance by the operation of the indexing mechanism 76 which is synchronized with the operation of the sealing machine as has been previously described. Although an indexing mechanism has been shown and described it is to be understood that other means which result in the synchronous operation of the carrier converging member 65 and sealing machine may be substituted.

As the carrier 14 moves, the tube 12 contained therein comes in contact with the gate 28 which is opened by the passage of the tube and subsequently closed by the spring 30. The base of the tube moves from the spring board 86 to the smooth surfaced pin track 94 upon which it will ride through the subsequent processing operations. The non-uniformly heated tube is then moved into the tunnel or controlled environment 16 where it is allowed to cool slowly so that the temperature differential between the envelope and tip is generally dissipated and the envelope was cooled below the strain point of the glass. The tunnel is of sufficient length so that when the tube is removed it has cooled to a temperature of approximately 275° F. This exit temperature is dependent on the length of tunnel and rate of movement of the tube through the tunnel.

After the tube is removed from the tunnel, it is forced cool to a temperature of approximately 105° F. by the air flow from the fans 118. The overhead sheet 115 contains the output of fans and spreads the cooling air over the tubes.

The tube 12 rides off the end of the track 94 at the end of the forced cooling area and drops into the insertion guiding means 122 of the delivery chute 123 where it comes to rest upon the gate 124. The getter is then flashed by the timed operation of the R-F induction coil 126 and the gate mechanism 124 is withdrawn allowing the tube to continue through the chute 123.

The number of carriers 14 employed may be the same as the number of exhaust ports on the sealing machine or some full multiple thereof. Therefore, the operation of a particular port may be checked with ease by examining the gas condition of a tube after it has been flashed and noting the carrier from which the tube came. This is particularly advantageous since evacuating difficulties are usually repetitive and in large scale production an uncorrected faulty port will result in a considerable number of rejected tubes. As previously explained, prior art processing methods are not readily adaptable to this type of operation.

When the tube size is changed as from the manufacture of T5½ to T6½, the changeover is made by simply replacing the loading chute 10, the set of carriers 14, and associated chain member 65.

Although several embodiments of the invention have been shown and described, it will be apparent to those skilled in the art that various changes and modifications may be made therein without departing from the scope of the invention as defined by the appended claim.

What is claimed is:

In an apparatus for treating a non-uniformly heated electron discharge device having a major and minor axis with a plurality of lead-in pins depending from one end thereof and parallel to said major axis the combination of a plurality of indexible carrier means, each of said carriers being formed to provide spaced legs interconnected by a base portion, said legs having aligned openings therein, heat insulating inserts disposed in said aligned openings, said inserts having a central aperture in which the device may be contained, said carrier being mounted by its base portion to an indexible member for movement along a path, means for moving said indexible member, a heat insulated loading chute having a flared entrance and a diminished exit, said exit portion being provided with a movable side portion, one of said carriers being positioned beneath said loading chute within said exit portion to receive a device therefrom intermediate the movement of said indexible member, a pin track positioned beneath said carriers along said carrier path, a heat insulating tunnel encompassing a portion of said path and having one end positioned adjacent said loading chute, and forced cooling means positioned adjacent the opposite end of said tunnel References Cited in the file of this patent
UNITED STATES PATENTS

| | | |
|---|---|---|
| 2,268,609 | Merrill | Jan. 6, 1942 |
| 2,412,302 | Spencer | Dec. 10, 1946 |
| 2,459,057 | Winograd | Jan. 11, 1949 |
| 2,629,233 | Olsen | Feb. 24, 1953 |
| 2,673,784 | Synder | Mar. 30, 1954 |
| 2,698,076 | Nilsson | Dec. 28, 1954 |
| 2,807,517 | Marschka et al. | Sept. 24, 1957 |
| 2,878,582 | Sieger | Mar. 24, 1959 |
| 2,871,086 | Korner et al. | Jan. 27, 1959 |